(12) United States Patent
Margolis

(10) Patent No.: US 10,935,753 B1
(45) Date of Patent: Mar. 2, 2021

(54) UNIVERSAL PHOTOGRAPHIC AND CINEMATOGRAPHIC LENS SYSTEM

(71) Applicant: H. Jay Margolis, Centennial, CO (US)

(72) Inventor: H. Jay Margolis, Centennial, CO (US)

( * ) Notice: Subject to any disclaimer, the term of this patent is extended or adjusted under 35 U.S.C. 154(b) by 148 days.

(21) Appl. No.: 16/058,903

(22) Filed: Aug. 8, 2018

Related U.S. Application Data

(60) Provisional application No. 62/547,652, filed on Aug. 18, 2017.

(51) Int. Cl.
*G02B 7/16* (2006.01)
*G02B 7/02* (2021.01)

(52) U.S. Cl.
CPC ............... *G02B 7/16* (2013.01); *G02B 7/021* (2013.01)

(58) Field of Classification Search
CPC .................................. G02B 7/16; G02B 7/021
USPC ......................................... 359/642, 754, 784
See application file for complete search history.

(56) References Cited

U.S. PATENT DOCUMENTS

| | | |
|---|---|---|
| 2,937,570 A | 5/1960 | Hillman |
| 3,023,673 A | 3/1962 | Cox et al. |
| 3,030,863 A | 4/1962 | Schwartz et al. |
| 4,015,895 A | 4/1977 | Hirose |
| 4,318,585 A | 3/1982 | Matsumura |
| 4,641,928 A | 2/1987 | Hamanishi |
| 4,988,173 A | 1/1991 | Margolis |
| 5,054,896 A | 10/1991 | Margolis |
| 5,452,133 A | 9/1995 | Margolis |
| 6,661,583 B2 | 12/2003 | Shinohara |
| 6,760,154 B1 | 7/2004 | Focht |
| 7,869,139 B2 | 1/2011 | Margolis |
| 7,880,978 B2 * | 2/2011 | Neil ........................ G02B 13/18 359/717 |
| 8,379,329 B2 * | 2/2013 | Nakayama ............. H04N 5/238 359/793 |
| 9,164,266 B2 | 1/2015 | Margolis |
| 9,116,101 B2 * | 8/2015 | Chen .................... G02B 21/367 |
| 2007/0273980 A1 * | 11/2007 | Horiuchi .............. G02B 15/173 359/687 |

FOREIGN PATENT DOCUMENTS

FR            2572545           5/1986

OTHER PUBLICATIONS

International Search Report from International Application No. PCT/US2010/024446, dated Apr. 16, 2010, 7 pages.

* cited by examiner

*Primary Examiner* — Tuyen Tra
(74) *Attorney, Agent, or Firm* — Leydig, Voit & Mayer, Ltd.

(57) ABSTRACT

The present invention relates to optical imaging systems which are able to provide increased depth of field to microscope devices, motion-picture cameras, and still photographic cameras. Optical systems described herein are able to provide the increased depth of field while maintaining wide field of view and reducing spherical aberration and distortion. Optical systems described herein are also able to be used with standard film and digital sensor formats, and are able to be attached to, or integrated with, photographic and motion-picture cameras, including currently existing cameras.

20 Claims, 15 Drawing Sheets

UNIVERSAL PHOTOGRAPHIC AND CINEMATOGRAPHIC LENS SYSTEM

CROSS-REFERENCE TO RELATED APPLICATIONS

This application claims priority from U.S. Provisional Patent Application No. 62/547,652, filed Aug. 18, 2017, which is incorporated by reference herein to the extent that there is no inconsistency with the present disclosure.

BACKGROUND OF THE INVENTION

The present invention generally relates to optical imaging systems which are able to provide increased depth of field to microscopes, motion-picture cameras, and still photographic cameras. Optical systems described herein are able to be used with standard film and digital sensor formats, and are able to be attached to, or integrated with, photographic and motion-picture cameras, including currently existing cameras Depth of field refers to the distance between the closest and furthest points in an image that are in acceptable focus. Thus, a greater depth of field generally means that more of the image will be in focus, while a smaller depth of field generally means that less of the image will be in focus.

A variety of factors can affect depth of field. For example, decreasing the camera aperture (thereby decreasing the light let into the camera) and increasing the time of exposure will typically increase the depth of field and will result in more of the image being in focus. In contrast, increasing the camera aperture (thereby letting in more light) will typically result in lower depth of field and less of the image being in focus. Additionally, the smaller an object and the closer the camera is positioned to the object will also typically decrease the depth of field. For example, in microscopy the objects can be bacteria, insects, and other small objects placed very close to the microscope or camera. Thus, the depth of field for these images is extremely small.

Scientific and commercial photographers will often go to extreme lengths, such as increasing the exposure time to a minute or more, to obtain greater depth of field so as to have multiple features of the object in focus. However, this type of long exposure requires very sensitive equipment, little to no vibration, and high light levels.

Similarly, optical systems which provide focus from close range to infinity are available. The principles of endoscopes, borescopes and the like incorporate a front objective relayed to a rear optical system and are well known in the art. However, such systems have restricted apertures, limited field coverage and significant distortion making them completely unsuited for use with high quality, large-sensor cameras and recording devices such as those used for motion picture and scientific photography and imaging. In particular, conventional optical systems which are designed to provide greater depth of field result in much narrower field coverage (i.e., field of view). Accordingly, the produced image may result in vignetting, be unsuitable for standard camera sensor sizes or film sizes, or may not capture the full object or picture desired by the photographer. As a result, multiple images will often have to be digitally combined to produce the full desired image. Some conventional optical systems attempt to correct the above defects by using relays or other types of optical fixes behind the objective lens; however, such systems greatly increase the size of the device (making such a device impractical), provide insufficient depth of field, or degrade the image quality.

The continuously-focusable microscope (U.S. Pat. No. 5,054,896 to Margolis) incorporates a relay based on the unique characteristics of afocal variation as a focusing means that can be focused to infinity. However, its imagery at a far distance is uncorrected and generally inadequate. Some additional optical systems have been developed on similar principles that are relatively long and cumbersome and also do not provide imagery similar in quality as provided by the present invention.

What is needed is an imaging device which provides a near distance to infinity focus (i.e., increased depth of field) with high imaging quality and field of view in a relatively compact configuration that also covers common formats used in technical and motion picture photography with limited distortion. It would also be beneficial if the device does not image dust, contaminates, or small particles present within the device itself.

SUMMARY OF THE INVENTION

In view of the foregoing, the present invention provides an imaging optical system which incorporates a novel set of optical and spatial relationships that establish the ability to maintain focus from near distance to infinity (i.e., a high depth of field) with a high degree of imaging quality at the final focal plane provided by electro-magnetic sensitive sensors and all other forms of recording media. The present invention further maintains suitable field coverage allowing larger objects or wider scenes to be photographed while also remaining compatible with high imaging quality camera formats and sensor sizes.

In certain embodiments, the present invention utilizes a series of optical and spatial relationships which stem from a unique application of a front objective lens system design which provides a substantial Modulation Transfer Function (MTF), a low amount of distortion, and a back focal distance which is relayed to a rear imaging system which in itself, is capable of being spaced so as not only to provide focus, but to allow the interfacing of various components such as prism and lensed erecting systems, filters, zoom systems and the like as are known in the art.

In an embodiment, the present invention provides an optical imaging system comprising: a) an optical housing able to hold one or more optical lens systems, the optical housing having a front end able to receive light from an object and a back end able to be attached to a camera, sensor, or microscope device; b) an objective lens system positioned within the optical housing; and c) a rear focusing system positioned behind the objective lens system within the optical housing, wherein the rear focusing system is able to transmit light or an image from the objective lens system to a rear imaging system, wherein the optical imaging system is able provide a depth of field ranging from approximately 200 mm to infinity, from 400 mm to infinity, 600 mm to infinity, 800 mm to infinity, or 2,000 mm to infinity.

The objective lens system benefits in construction and performance by using modified lens systems of what are typically thought of as eyepiece designs, including, but not limited to, modified Erfle lens systems, modified Konig lens systems, and modified Nagler lens systems—in fact, any eyepiece found applicable. However, the field coverage of eyepiece types varies by design and complexity. Moreover, eyepiece designs are assumed to have one side set to an infinity beam. By utilizing one side or the other towards or away from the object, aberrations can be controlled or deliberately introduced (for example, to produce artistic effects). For example, by choosing to use a modified Erfle lens design, a good field coverage is obtained. However, it can be desirable for artistic reasons to use a lesser field type, such as a modified Petzval lens, which is not considered as an eyepiece configuration but more generally considered to be a microscope objective configuration and therefore less appropriate for a quality field, so as to deliberately introduce field imperfections which may be considered artistic. By dint of modifications detailed herein, the present invention obtains a novel and improved performance, yet can be embodied in compact way.

In embodiments, the present invention utilizes a three-lens objective to which a frontal corrector lens is preferably added to achieve c. 5% greater reduction, preferably c. 10% greater reduction, preferably c. 12% greater reduction in distortion than if the corrector lens were not employed. This construction also fulfills the requirement to keep the system compact. Yet, in certain embodiments the frontal objectives can be interchanged and, due to their novel construction, be relayed by a secondary rear optical system without imaging dust or other contaminants, all while the construction of the relay permits the interfacing of still other components.

In embodiments, the present invention provides an optical imaging system comprising: a) an optical housing able to hold one or more optical lens systems, the optical housing having a front end able to receive light from an object and a back end able to be attached to a camera, sensor, or microscope device; b) a frontal corrector lens system positioned within the optical housing, wherein the frontal corrector lens system is able to decrease system distortion by c.5% or more, preferably c. 10% or more, preferably c. 12% or more; c) an objective lens system positioned behind the frontal corrector lens system within the optical housing comprising a front objective lens system, a middle lens system, and a rear lens system; and e) a rear focusing system positioned behind the objective lens system within the optical housing, wherein the rear focusing system is able to transmit light or an image from the objective lens system to a rear imaging system.

In embodiments of the invention, the objective lens system comprises a front objective lens system having a focal length of 30 mm, a middle lens system having a focal length of 100 mm, and a rear lens system having a focal length of 40 mm. In embodiments, the objective lens system preferably comprises a front objective lens system having a focal length of 30 mm (±10%), a middle lens system having a focal length of 100 mm (±10%), and a rear lens system having a focal length of 40 mm (±10%); or a front objective lens system having a focal length of 30 mm (±5%), a middle lens system having a focal length of 100 mm (±5%), and a rear lens system having a focal length of 40 mm (±5%).

In alternative embodiments of the invention, the objective lens system comprises a front objective lens system having a focal length of 30 mm, a middle lens system having a focal length of 15 mm, and a rear lens system having a focal length of 30 mm. In embodiments, the objective lens system preferably comprises a front objective lens system having a focal length of 30 mm (±10%), a middle lens system having a focal length of 15 mm (±10%), and a rear lens system having a focal length of 30 mm (±10%); or a front objective lens system having a focal length of 30 mm (±5%), a middle lens system having a focal length of 15 mm (±5%), and a rear lens system having a focal length of 30 mm (±5%).

The optical imaging systems described herein are able to provide a depth of field ranging from approximately 200 mm to infinity. Preferably, the optical imaging system is able to provide a depth of field ranging from approximately 2000 mm to infinity, approximately 800 mm to infinity, approximately 600 mm to infinity, approximately 500 mm to infinity, approximately 400 mm to infinity, or approximately 200 mm to infinity. In an embodiment, the optical imaging system is able to provide a depth of field beginning at approximately 2000 mm, beginning at approximately 800 mm, more preferably beginning at approximately 400 mm, and more preferably beginning at approximately 200 mm.

Optionally, one or more lenses of the objective lens systems are derived preferably from an eyepiece type configuration described herein comprise achromatic lenses or planocovex lenses. In embodiments, the front objective lens system has a front surface which is curved toward the front end of the housing. Alternatively, the front objective lens system has a flat surface which faces the front end of the housing, or has a front surface which is curved toward the rear end of the housing. In embodiments, the objective lens system is a modified Erfle lens system, modified Konig lens system, or modified Nagler lens system, or potentially any eyepiece derived configuration, with the Erfle type represented herein as what appears to be, in concert with the modification presented herein, the most efficient and overall economical variety. In any embodiment described herein, distances between lenses of the optical imaging system can be positioned and/or adjusted to provide an image as is known in the art. Additionally, one or more lenses of the optical imaging system are moveable, deformable, or are able to vibrate so as to focus the image or otherwise provide the desired image.

Preferably, the objective lens systems describe herein are able to provide the depth of field while maintaining a wide field of view. For example, in embodiments, the objective lens system has an angular field of view (AFOV) of 40° or more, preferably of 50° or more, or preferably 60° or more.

The frontal corrector lens system is able to decrease system distortion by c.5% or more, preferably by c.10% or more, or by at least approximately c.12%. In an embodiment, the frontal corrector lens system has a focal length of approximately 100 mm or more, 300 mm or more, 500 mm or more, or 700 mm or more. In an embodiment, the frontal corrector lens system has a focal length between 400 mm to 1000 mm, or between 500 mm to 750 mm. In an embodiment, the frontal corrector lens system has a focal length of approximately 750 mm. Preferably, the frontal corrector is an achromatic lens. The frontal corrector can have a flat front surface, a front surface which curves toward the front end of the housing, or a front surface which curves toward the rear end of the housing.

The rear focusing systems described herein can be any lens or series of lenses able to transmit light or an image from the objective lens system to a rear imaging system (such as the imaging system of a camera, sensor, microscope and other optical devices). In embodiments of the invention, the rear focusing system is able to move or deform one or more lens element to adjust the focus of the optical imaging system. This can be done to precisely focus the device at a specific point, or to provide adjustments so that the optical imaging system is compatible with multiple formats, cameras, and other optical devices. In alternative embodiments, the rear focusing system provides a fixed focal length. Although the rear focusing system in the present invention may be configured or adjusted to provide precise focus at a specific point, objects on either side of the focal point within the depth of field remain in acceptable focus. In embodiments of the invention, the rear focusing system comprises, in series, a first 50 mm (±10%) lens, a second 50 mm (±10%) lens, and a −20 mm (±10%) lens; however this configuration and arrangement can be modified as desirable to be compatible the particular microscope or camera.

Preferably, the optical imaging devices described herein is compact to allow for easier use and integration with existing cameras and other optical devices. In an embodiment, the optical housing has a length of approximately 400 mm or less, 300 mm or less, or 200 mm or less.

In embodiments of the invention, the optical imaging device is used with current motion picture and photographic cameras, including, but not limited to, 23 mm, 24 mm, 35 mm, 70 mm, and 8×10 inch camera formats, and digital cameras and other devices having sensor sizes including, but not limited to, 36 mm×24 mm, APS-H 27.9 mm×18.6 mm, APS-C 23.6 mm×15.6 mm, 22.2 mm×14.8 mm, 18.7 mm×1 mm, and MFT 4/3 inches, and one inch (12.8 mm×9.6 mm).

In embodiments, the present invention provides a compact and easy to use optical device which allows a user to quickly take high quality still photographs, videos, and/or cinematographic images, where the majority of objects beyond a certain distance will automatically be in focus. The optical imaging system comprises: a) an optical housing able to hold one or more optical lens systems, the optical housing having a front end able to receive light from an object and a back end able to be attached to a camera; b) an objective lens system positioned within the optical housing comprising a front objective lens system, middle lens system and rear lens system; c) a rear focusing system positioned behind the objective lens system within the optical housing, wherein the rear focusing system provides a fixed focal length and is able to transmit light or an image from the objective lens system to a rear imaging system. The objective lens system optionally comprises a front objective lens system having a focal length of 30 mm, a middle lens system having a focal length of 15 mm, and a rear lens system having a focal length of 30 mm; or a front objective lens system having a focal length of 30 mm, a middle lens system having a focal length of 100 mm, and a rear lens system having a focal length of 40 mm. Other objective lens systems or mirrored devices can be utilized, but an objective lens system derived from an eyepiece system is preferred.

The optical imaging system is able provide a depth of field ranging from approximately 200 mm to infinity (optionally from 400 mm to infinity, 600 mm to infinity, 800 mm to infinity, or 2,000 mm to infinity). Accordingly, a user (even an amateur photographer) can quickly aim the device and the majority of objects will automatically be in focus with little to no adjustment by the user. The optical system optionally further comprises a frontal corrector lens system positioned in front of the objective lens within the optical housing, wherein the frontal corrector lens system is able to impart spherical correction to an image formed by the optical imaging system.

In another embodiment, the present invention provides an optical kit comprising two or more interchangeable objective lens systems, wherein each of the interchangeable objective lens systems is able to be attached in optical communication to a rear focusing system so as to form an optical imaging system. Preferably, at least one of the two or more interchangeable objective lens systems comprises an objective lens system comprising a front objective lens system having a focal length of 30 mm, a middle lens system having a focal length of 15 mm (or alternatively 100 mm), and a rear lens system having a focal length of 30 mm (or alternatively 40 mm). The optical imaging system is able to provide a depth of field ranging from approximately 200 mm to infinity.

In the embodiments described herein, focal lengths and distances are typically provided in millimeters (mm). Such values are understood to encompass focal lengths and distances that are equal to the given value in mm, preferably ±1% of the given value, preferably ±2% of the given value, preferably ±5% of the given value, or preferably that are ±10% of the given value. For example, a description of an objective lens system comprising a front objective lens system having a focal length of 30 mm, a middle lens system having a focal length of 15 mm or 100 mm, and a rear lens system having a focal length of 30 mm or 40 mm, would also encompass a front objective lens system having a focal length of 30 mm (±10% or ±5%), a middle lens system having a focal length of 15 mm (±10% or ±5%) or 100 mm (±10% or ±5%), and a rear lens system having a focal length of 30 mm (±10% or ±5%) or 40 mm (±10% or ±5%).

By setting the spatial relationship of the objective lens systems described herein to the movement of a focusing lens system, when an object is imaged at a distance of infinity, dust, small particles, or other contaminants will not be imaged simultaneously at any focus there or when refocused to provide an image at its closest distance. Consequently, dust, small particles, or other contaminants are virtually unable to be noticed or imaged by the present invention when, at the same time, a usable image is provided.

By dint of setting the relationship noted above, a series of objectives can be moved in or out of operative position on a turret, slider or any other suitable exchanging device. As positioned in turn, the insensitivity to the imaging of dust or unwanted contaminants will be the same as that provided as if a single objective were employed one at a time.

The ability of the present invention to provide insensitivity to the imaging of dust or other contaminants makes it possible to introduce reticles, graticules or other types of reference data which can be inserted on a light transmitting material or supported by other known means. For example, reference data or information such as time, compass directions, geographical or other information by means of LED, LCD or similar displays can be introduced and imaged at the position just previous to where dust or other contaminants could or would be imaged. Alternatively, focus can be shifted within the distance between the lenses so that only the introduced reticle, graticule or reference data can be imaged with no object itself being imaged other than the introduced material.

Recently, camera sensors have been developed that achieve ISO 25,000 or more which have very limited noise characteristics. Although the present invention in some embodiments may have some diminished light transmission, when used with such cameras it can even be used for the production of motion pictures and other critical needs. While it is desirable to use the present invention with such cameras, it is not limited to their utilization.

BRIEF DESCRIPTION OF THE DRAWINGS

The accompanying drawings illustrate or describe various aspects and embodiments of the present invention.

DETAILED DESCRIPTION OF THE INVENTION

Definitions

Figure 1:
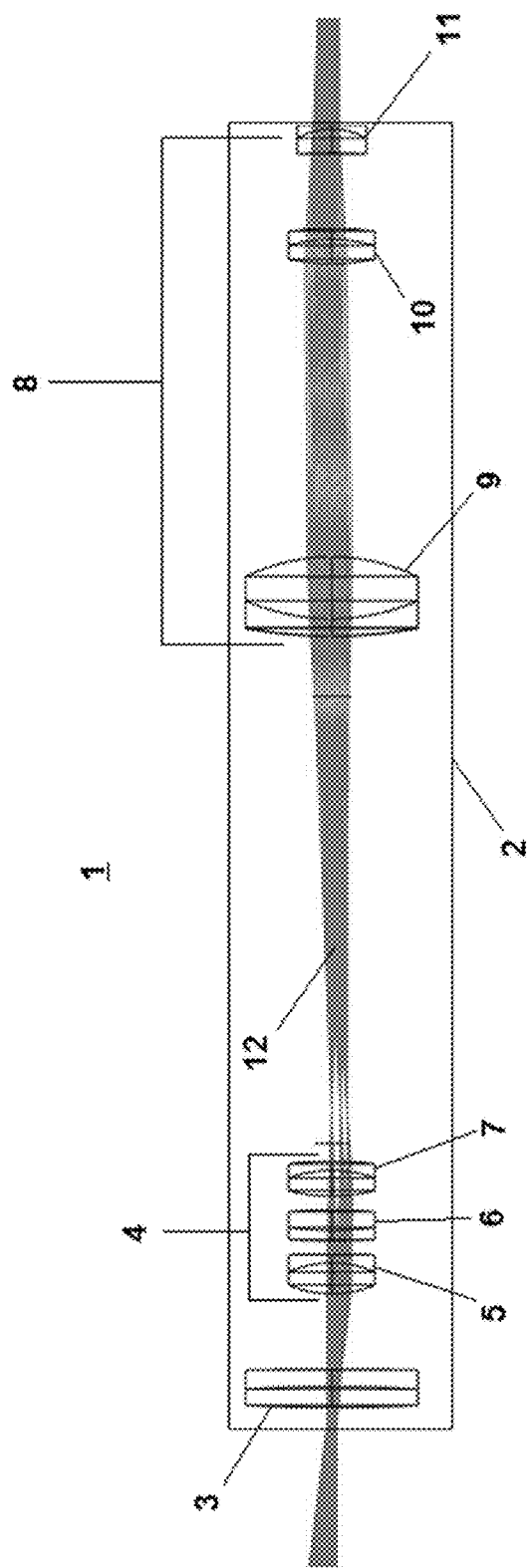
FIG. 1 illustrates an optical imaging system in an embodiment of the present invention where the objective lens system has a 30 mm front objective lens system, a 100 mm middle lens system, and a 40 mm rear lens system.

The terms and definitions contained herein are used according to their normal definitions as understood in the art. The following definitions are provided to add further clarification to the terms.

"Depth of field" refers to the distance between the closest and furthest points in an image that are in acceptable focus. Although a lens can precisely focus at only one distance at a time, the decrease in sharpness is gradual on each side of the focused distance, so that within the depth of field, the lack of sharpness is imperceptible under normal viewing conditions.

"Field of view" refers to the part of an object or scene that is projected onto the camera sensor or film by an optical system. Objects outside the field of view when the picture is taken are not recorded in the photograph. It is often expressed as the angular size of the view cone as "angular field of view".

As used herein, the term "lens system" can refer to a single lens or lens element, or to multiple lenses and lens elements, such as doublets or triplets, as known in the art. For example, the lens systems described herein can each comprise a single lens or multiple lenses, such as doublets or triplets, as known in the art. In a further embodiment, the microscopes, cameras and devices used with the optical imaging device further comprises one or more additional optical components, including but not limited to eye pieces, sensors, cameras, corrective lens systems, beam splitters, polarizers, prisms, illuminators and combinations thereof, to modify and produce the final image or images. The additional optical components may be used in conjunction with the objective lens system, or placed along the optical path.

"Focal length" is the distance between the center of a lens or optical system and its focal point. "Focal plane" refers to the imaginary line perpendicular to the optical axis which passes through a lens's or optical system's focal point.

"Spherical aberration" is the lens aberration resulting from the increased refraction of light rays passing through or near the edge of the lens compared to light rays passing through or near the center of the lens. Light rays across different regions of the lens are focused at different points resulting in an imaging having increased blur.

"Chromatic aberration" is the lens aberration resulting from the normal increase in refractive index of all common materials toward the blue end of the spectrum. The change in image size from one color to another is known at lateral chromatic difference of magnification.

As used herein, "infinity focus", "set to infinity" or being able to form a "focus to infinity" is the state where a lens or other optical system is able to form an image of an object an infinite distance away. Infinity focus places the plane of focus at a sufficiently far distance that light from than plane reaching the lens are essentially parallel.

Overview

In certain aspects, the present invention utilizes unique spatial and optical relationships to provide simple and compact optical imaging systems and devices, which are able to provide increased depth of field to microscope devices, motion-picture cameras, still photographic cameras, and other devices. Embodiments of the present invention provide optical imaging devices having an objective lens system comprising a front objective lens system having a focal length of 30 mm, a middle lens system having a focal length of 15 mm (or alternatively 100 mm), and a rear lens system having a focal length of 30 mm (or alternatively 40 mm).

The objective lens system is constructed of elements which, in themselves, provide a reasonable image which can be presented to a rear focusing system. However, in additional embodiments, they are supplemented by a frontal corrector lens which is able to decrease system distortion. For example, in certain embodiments system distortion is decreased by up to approximately c.12%. By dint of this construction, an image is formed in aerial space which is conveniently intercepted by a rear relay focusing system that does not focus upon any dust or other contaminants. The construction of the objective is such that its principles can be applied to various focal lengths which also present their images in aerial space at precisely the same plane as others of a series. As a result, it is possible to exchange one frontal objective with another and essentially be in total parfocality with the others. This reduction in system distortion by the use of the front corrector extends to several, if not all, focal lengths of objectives so derived. The reduction in distortion further distinguishes the performance of the present invention and justifies its dependable use for motion picture (cine), advertising and scientific photography.

Figure 6:
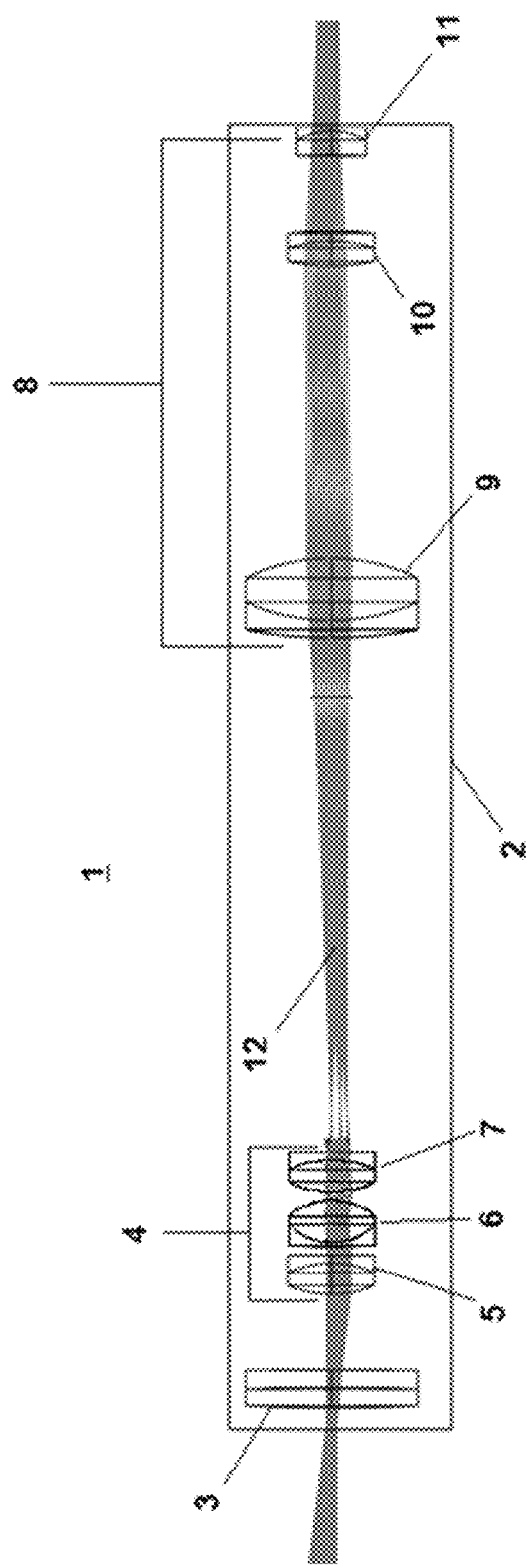
FIG. 6 illustrates an optical imaging system in an embodiment of the present invention where the objective lens system has a 30 mm front objective lens system, a 15 mm middle lens system, and a 30 mm rear lens system.

FIGS. 1 and 6 each show a layout of an exemplary optical imaging system 1 comprising an optical housing 2 which contains a frontal corrector lens system 3 and an objective lens system 4 in optical communication with a rear focusing system 8. Light rays 12 enter the front of the optical imaging system 1 (the left side as depicted in the figures) and are transmitted through the rear focusing system 8 to a rear imaging system (not shown) which can be part of a standard camera, sensor, microscope, or other optical device. In one aspect, the optical imaging systems of the present invention are useful in that they can be attached or integrated with pre-existing cameras and optical devices. The housing 2 may optionally contain additional optical devices, such as apertures, irises, and diaphragms to control the amount of light through the system and to limit optical aberrations (such as spherical and chromatic aberration) as known in the art.

The rear focusing system 8 can be any lens system able form an image when used in conjunction with the rest of the imaging system and includes fixed focal length lens systems as well as lens systems which provide adjustable focus. FIGS. 1 and 6 depict an exemplary rear focusing system 8 having a first rear lens system 9, a second rear lens system 10 and a third rear lens system 11; however, the number, configuration, and types of lenses can vary in order to adjust one or more parameters of the imaging system. For example, in some embodiments, the rear focusing lens system 8 comprises a first 50 mm lens, a second 50 mm lens, and a −20 mm lens, where the −20 mm lens is used to provide improved field coverage. Alternatively, the −20 mm lens and the second 50 mm could be replaced with a single lens.

The objective lens system 4 is formed by a front objective lens system 5, a middle lens system 6, and a rear lens system 7. In certain embodiments, the objective lens system 4 resembles a modified Erfle lens. FIGS. 1 and 6 differ from one another in that the objective lens system 4 of FIG. 1 comprises a 30 mm front objective lens system, a 100 mm middle lens system, and a 40 mm rear lens system, while the objective lens system 4 of FIG. 6 comprises a 30 mm front objective lens system, a 15 mm middle lens system, and a 30 mm rear lens system. While other objective lenses could be used in the present invention, these objective lens systems are beneficial in that once the device is properly focused on an object, internal dust is not imaged.

Figure 2:
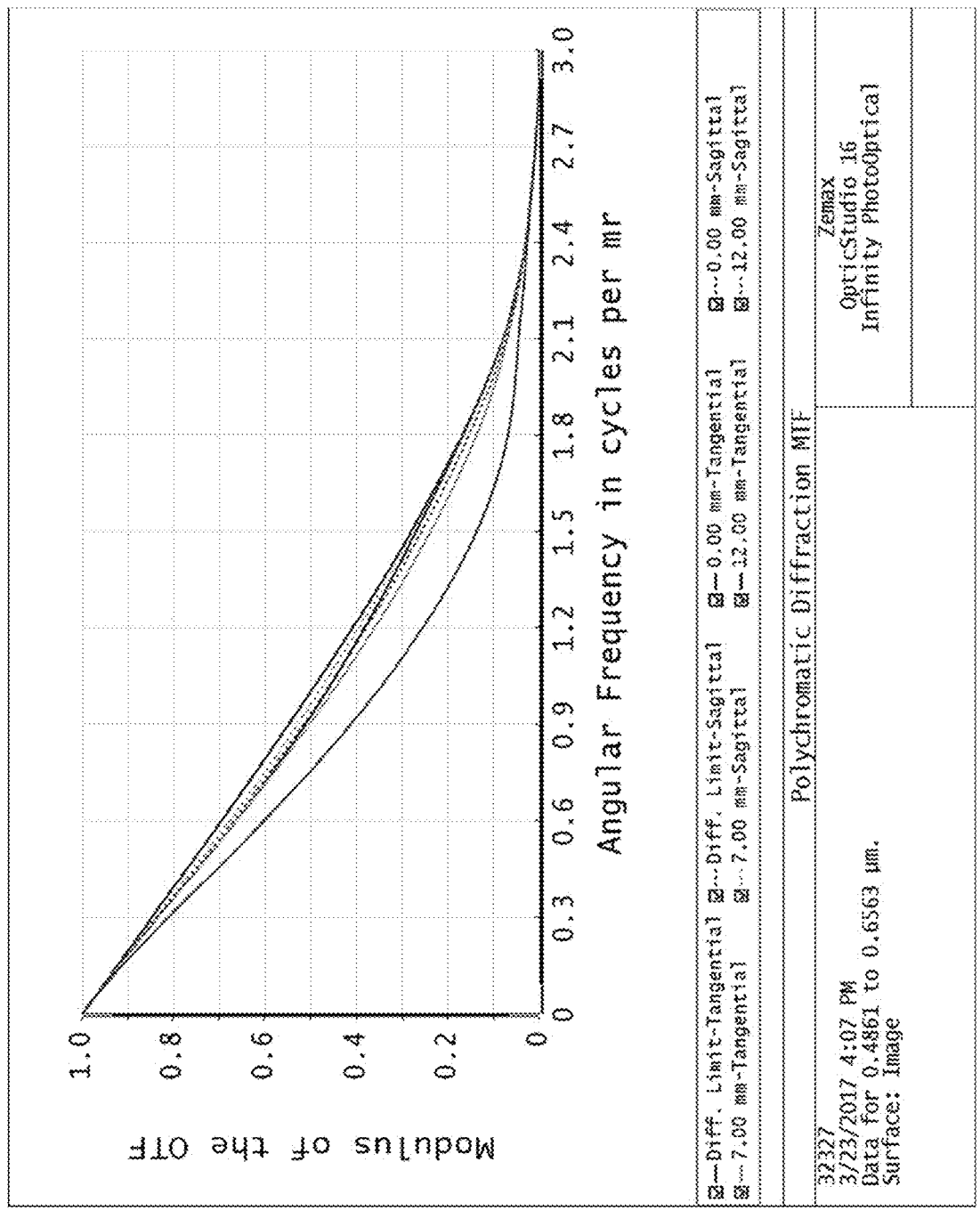
FIG. 2 shows a Modulation Transfer Function (MTF) for the optical imaging system depicted in FIG. 1.
Figure 7:
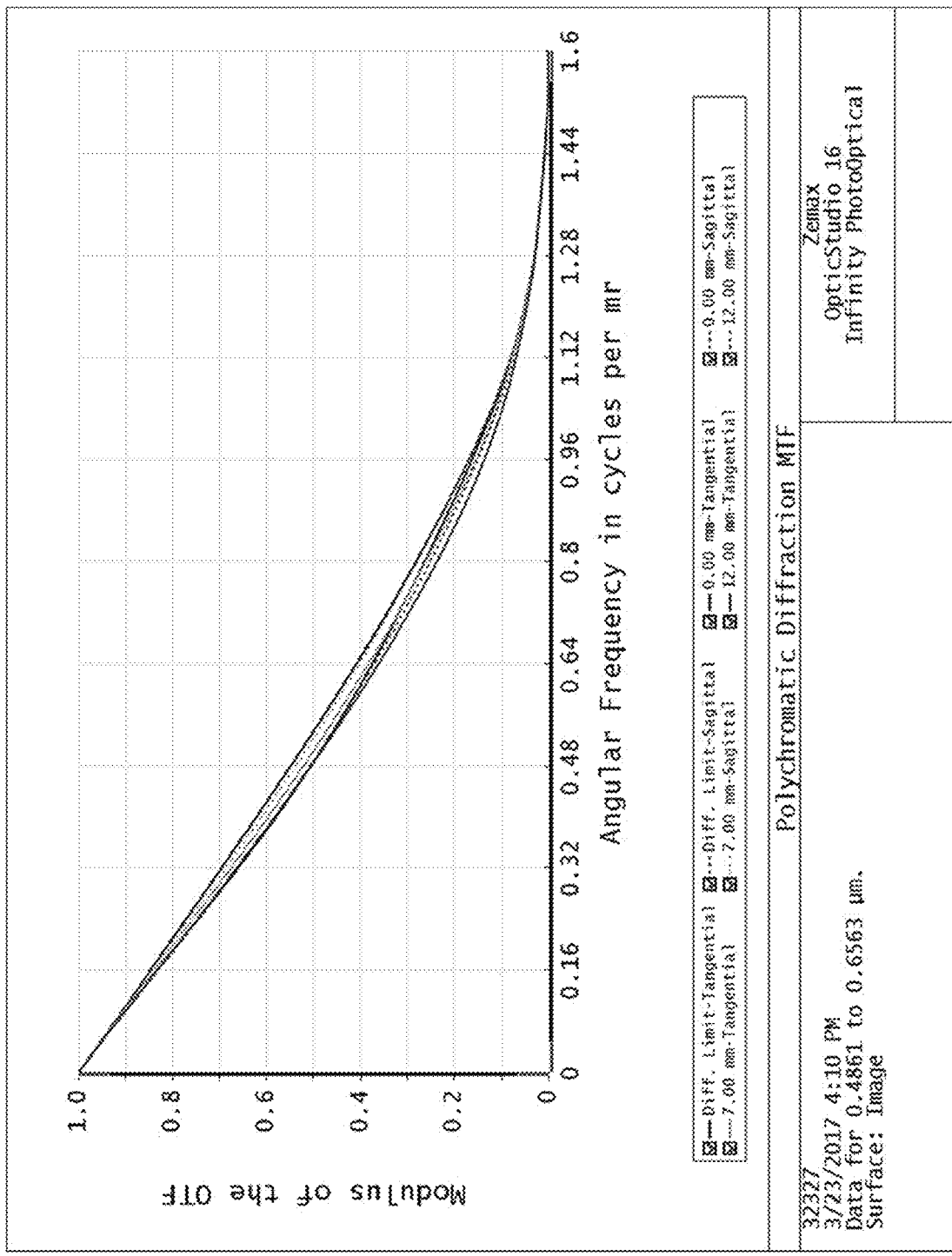
FIG. 7 shows a Modulation Transfer Function (MTF) for the optical imaging system depicted in FIG. 6.

FIGS. 2 and 7 show a Modulation Transfer Function (MTF) for the optical imaging systems depicted in FIGS. 1 and 6, respectively. The MTF curves for both imaging systems are similar to the theoretical ideal MTF, which represent an improvement over conventional devices.

Figure 3:
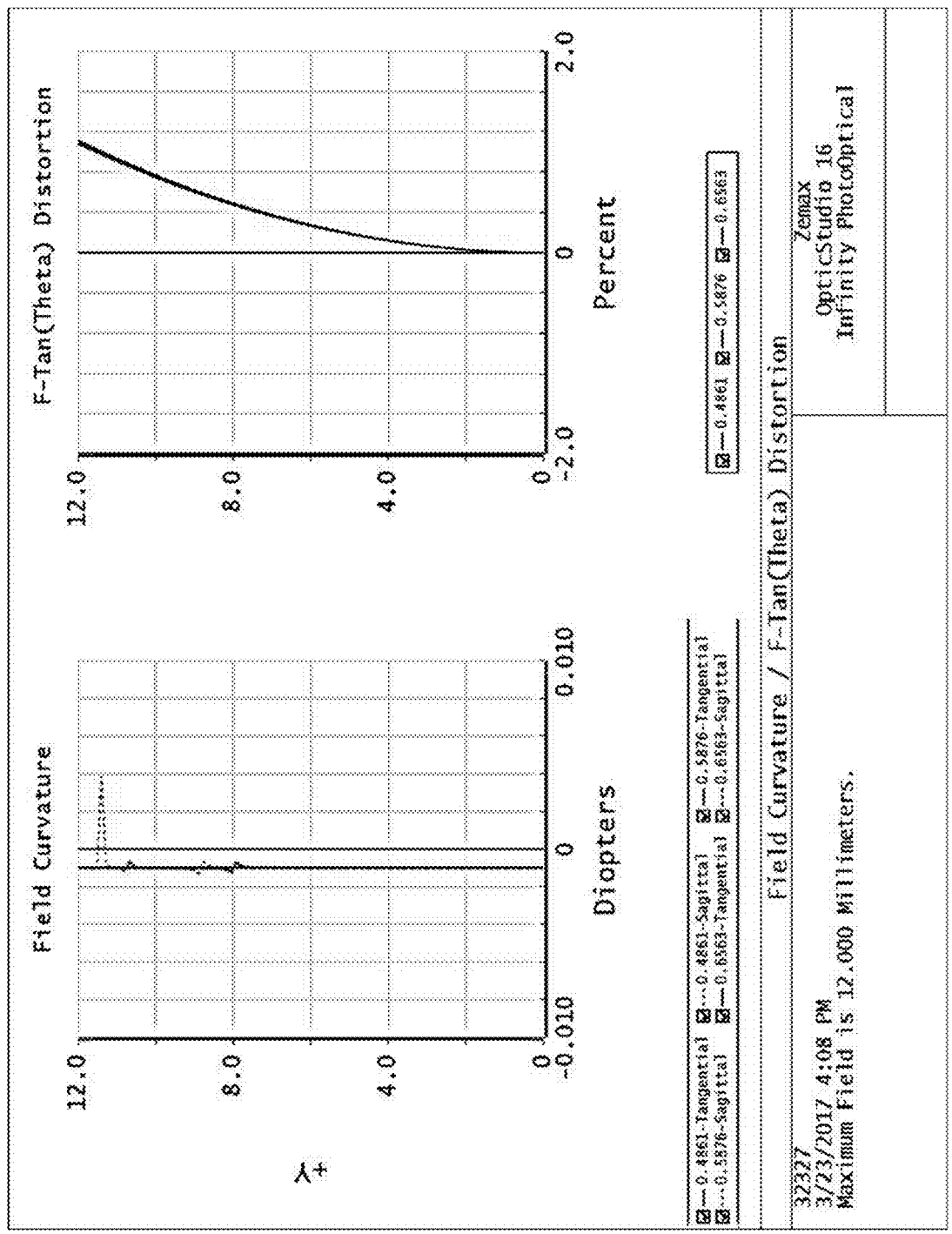
FIG. 3 shows field curvature and F-Tan (Theta) distortion data for the optical imaging system depicted in FIG. 1.
Figure 5:
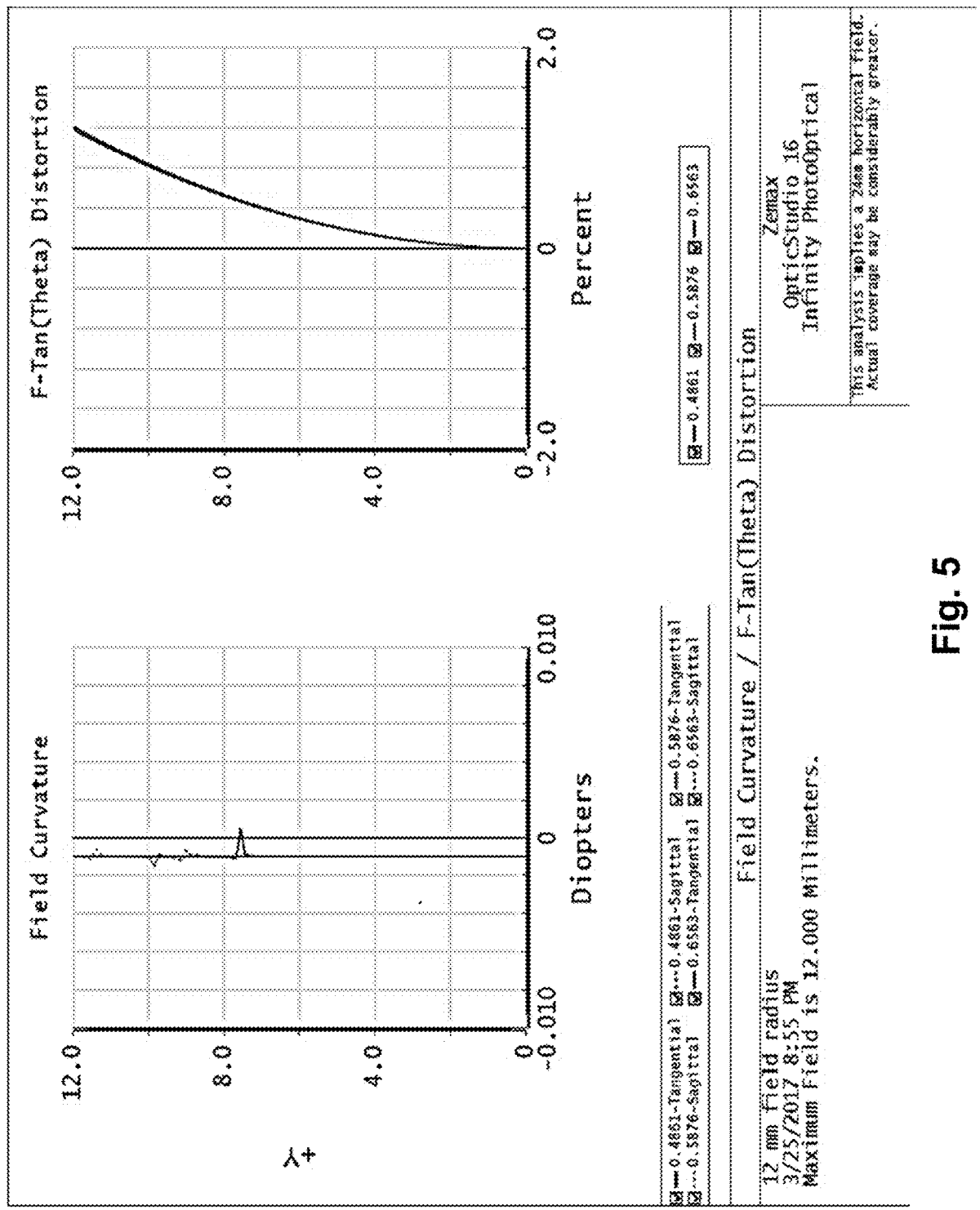
FIG. 5 shows field curvature and F-Tan (Theta) distortion data for an optical imaging system similar to FIG. 1 but which lacks the front corrector lens
Figure 8:
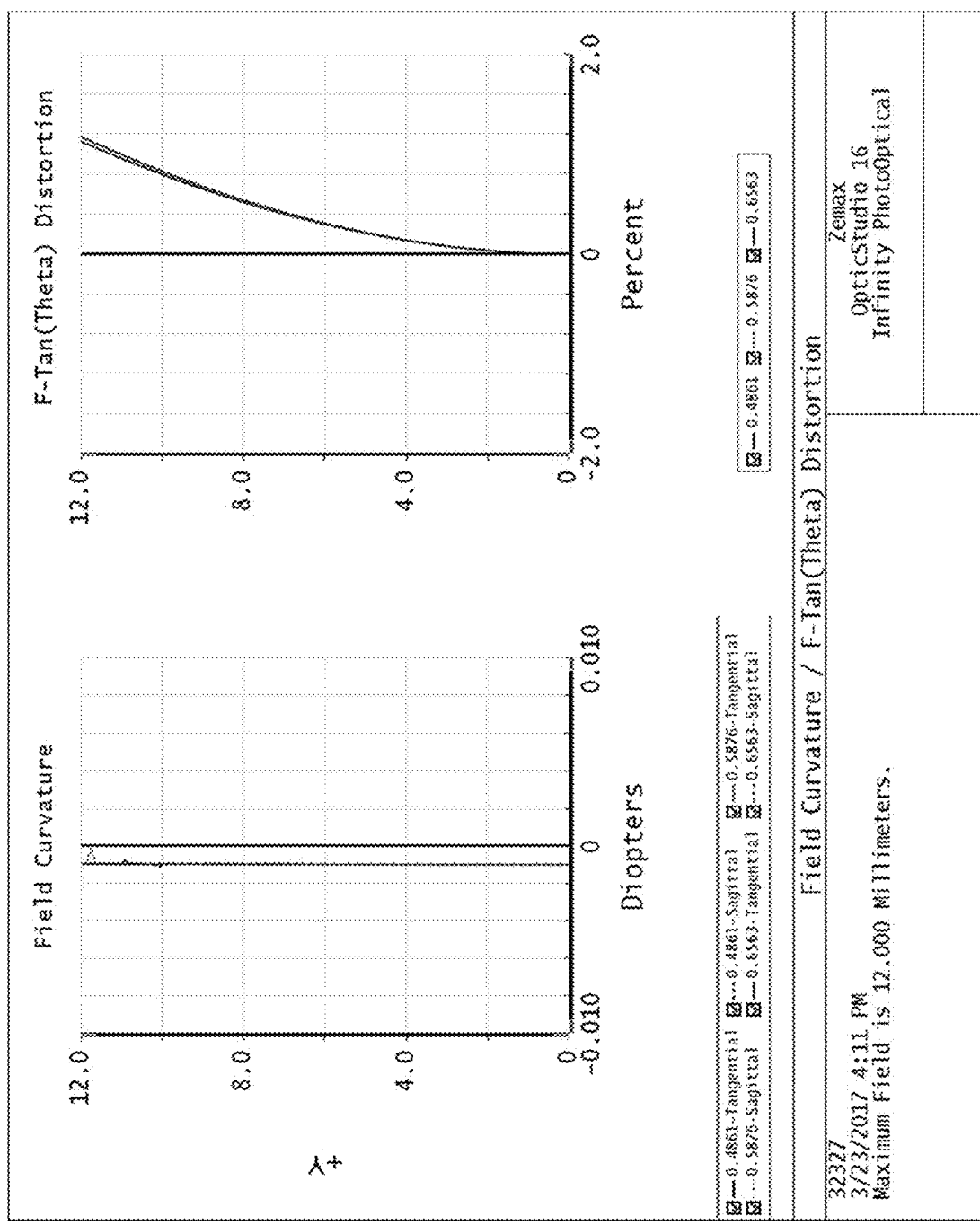
FIG. 8 shows field curvature and F-Tan (Theta) distortion data for the optical imaging system depicted in FIG. 6.

Similarly, FIGS. 3 and 8 show field curvature and F-Tan (Theta) distortion data for the optical imaging systems depicted in FIGS. 1 and 6, respectively. Both imaging systems show limited field curvature and distortion. Optionally, the optical imaging system 1 contains a front corrector lens system 3 in order to reduce system distortion and to provide higher image quality. FIG. 5 shows field curvature and F-Tan (Theta) distortion data for an optical imaging system similar to that of FIG. 1, but where the front corrector lens is absent. As a result, the distortion is approximately 10% greater than seen in FIG. 3.

Figure 4:
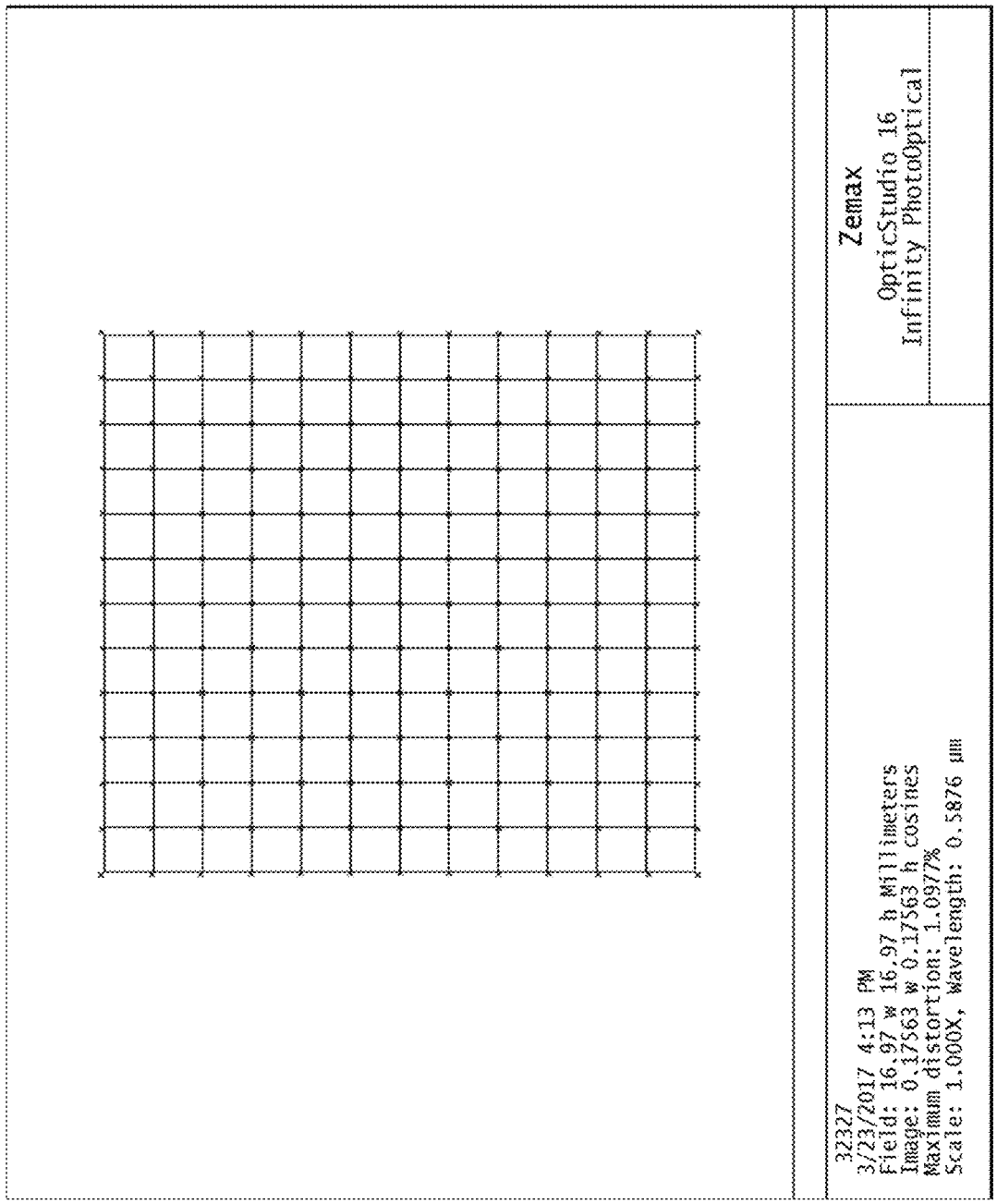
FIG. 4 shows grid distortion (geometrical distortion) for the optical imaging system depicted in FIG. 1.
Figure 9:
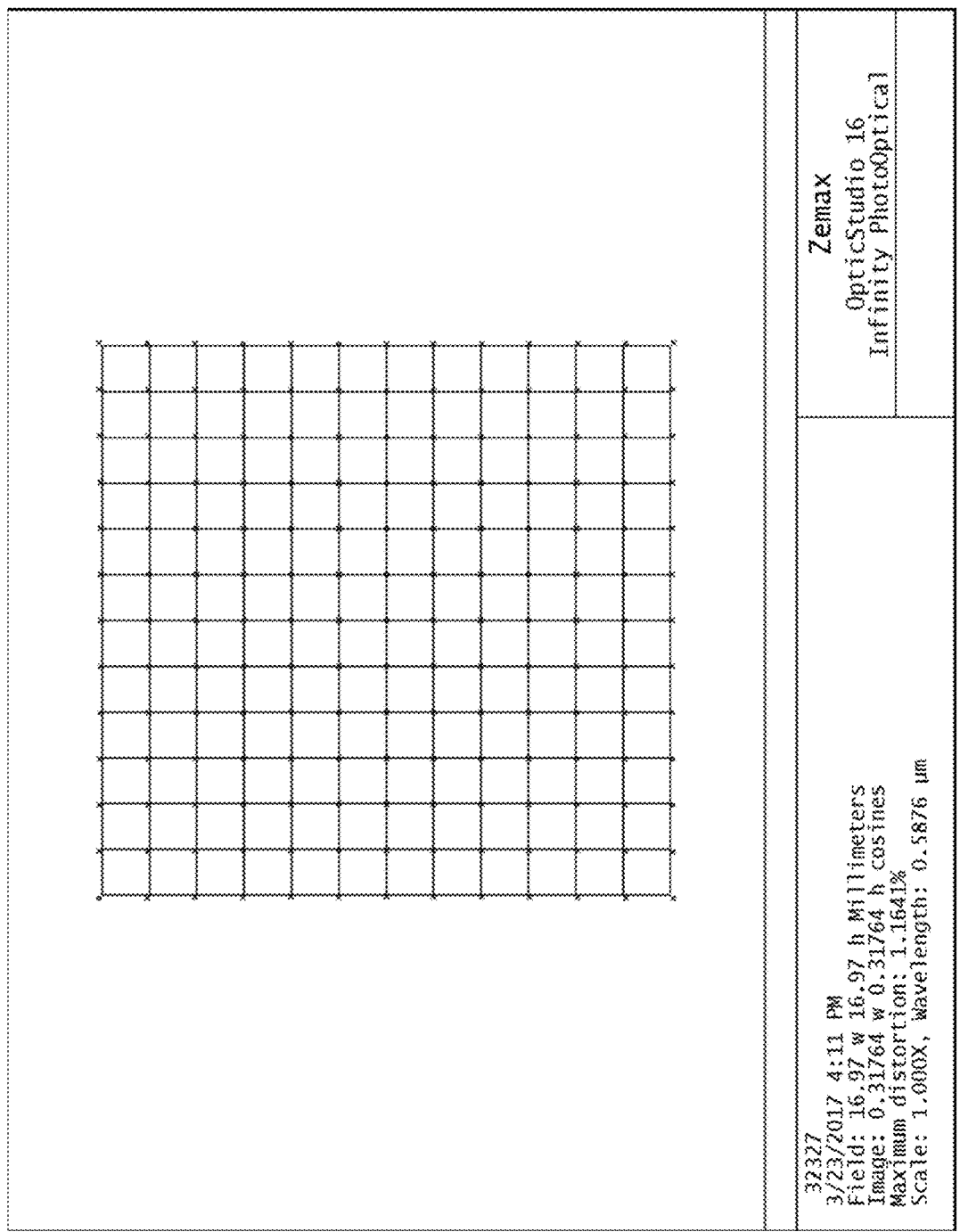
FIG. 9 shows grid distortion (geometrical distortion) for the optical imaging system depicted in FIG. 6.

FIGS. 4 and 9 show grid distortion (geometrical distortion) for the optical imaging systems depicted in FIGS. 1 and 6, respectively. Geometric distortion is an aberration manifested by changes in the shape of an image. The two most prevalent types of geometric distortion, positive and negative (often termed pincushion and barrel, respectively), can often be present in very sharp images that are otherwise corrected for spherical, chromatic, comatic, and astigmatic aberrations. However, FIGS. 4 and 9 show little geometric distortion.

Figure 10:
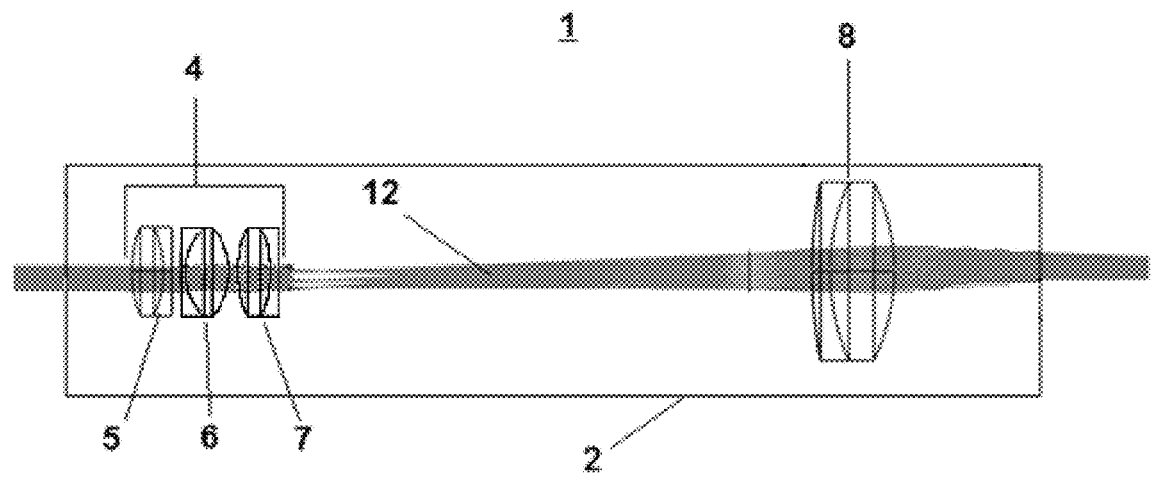
FIG. 10 shows simplified optical imaging systems in an embodiment of the present invention, where the front corrector lens is absent and the rear focusing system is a fixed focus lens. In the top configuration, the objective lens system comprises a front objective lens system, a middle lens system, and a rear lens system. In the bottom configuration, the objective lens system comprises a front and rear objective lens systems.
Figure 10:
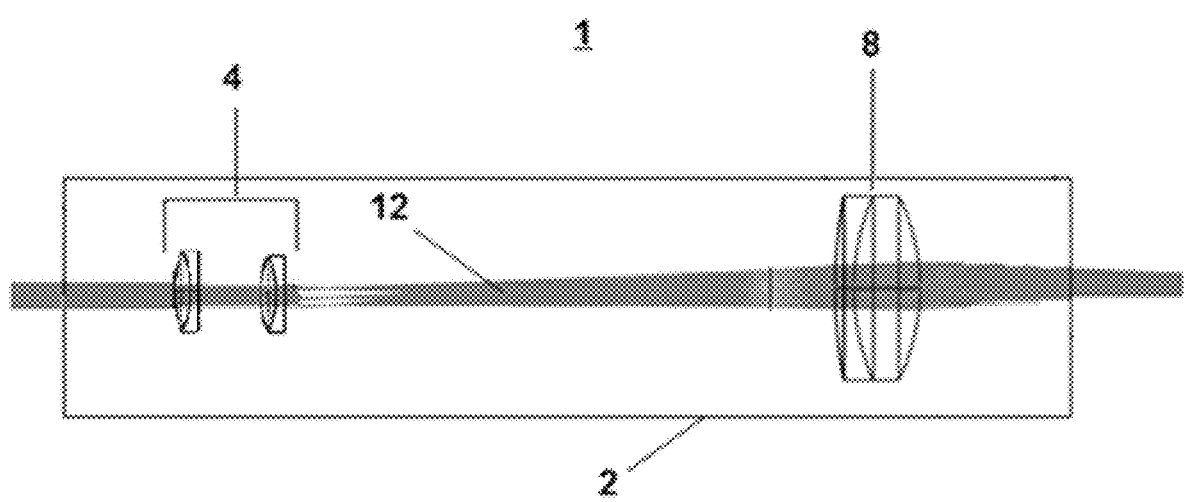

FIG. 10 shows simplified optical imaging systems 1 in an embodiment of the present invention, where the front corrector lens is absent and the rear focusing system 8 is a fixed focus lens. This device has a slightly smaller depth of field and slightly greater distortion than a similar optical imaging system (such as the device depicted in FIG. 1), but the simplified device has lower manufacturing costs and still enables a user to quickly take still photographs having good field of view and where the majority of objects beyond a certain distance will automatically be in focus (i.e., a depth of field of approximately 2000 mm to infinity). In the top configuration, the objective lens system 4 resembles a modified Erfle lens system and comprises a front objective lens system 5, a middle lens system 6, and a rear lens system 7. In the bottom configuration, the objective lens system 4 resembles a modified Petzval lens system and comprises just a front and rear objective lens systems. A Petzval lens system (not generally considered as having an eyepiece derived design) of equal focal length as obtained from a modified Erfle lens system of the invention (which is generally considered as having an eyepiece derived design) will likely show less outer field quality in comparison to the modified Erfle lens system. However, such effects may be desirable for artistic or creative imaging purposes. Although not shown in FIG. 10, it should be understood that systems incorporating a modified Petzval lens system, or other types of modified lens systems, can also be used in conjunction with a front corrector lens and other rear focusing systems.

Figure 11:
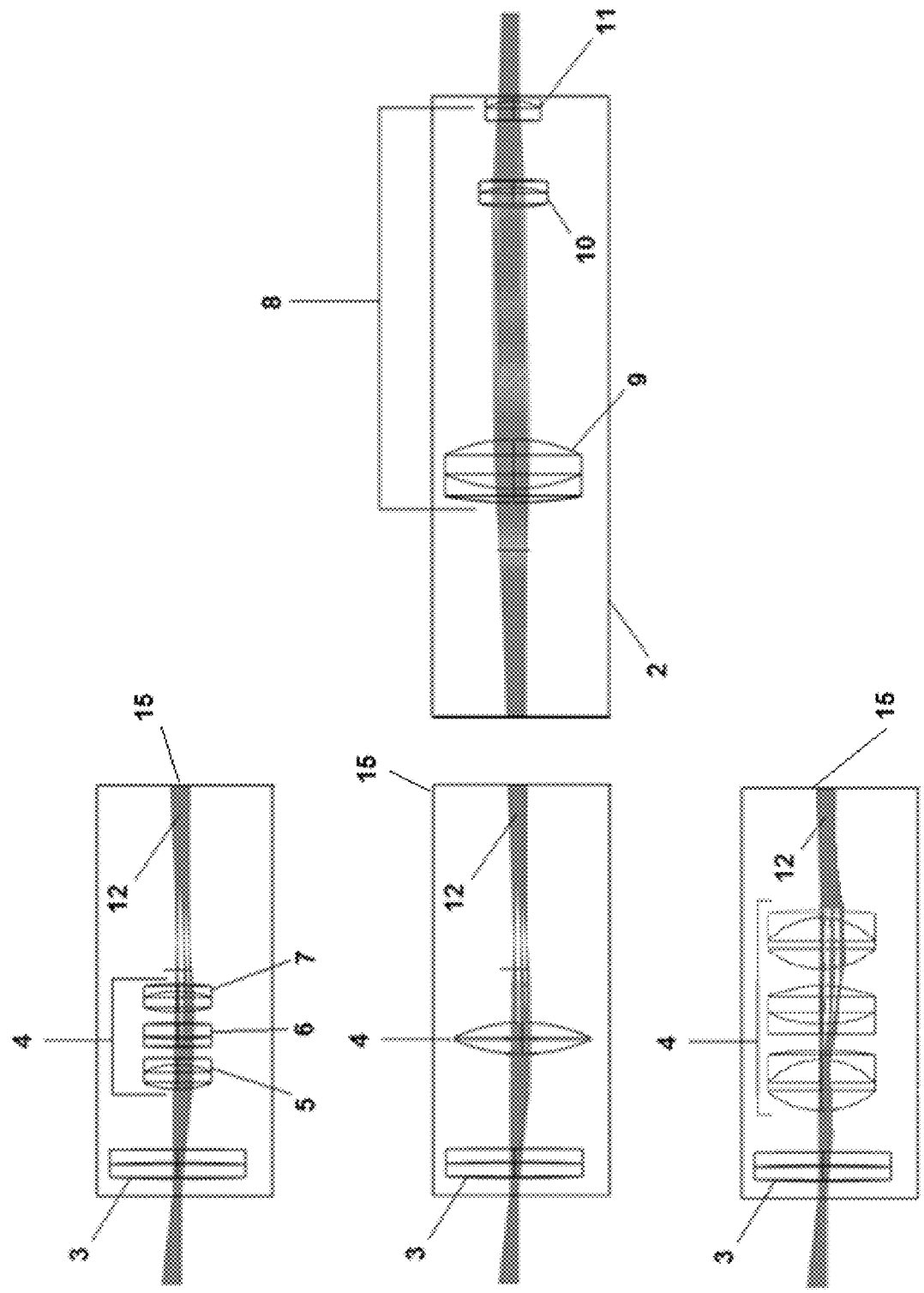
FIG. 11 shows an embodiment where the rear focusing system can be paired with interchangeable objective lens system modules.
Figure 12:
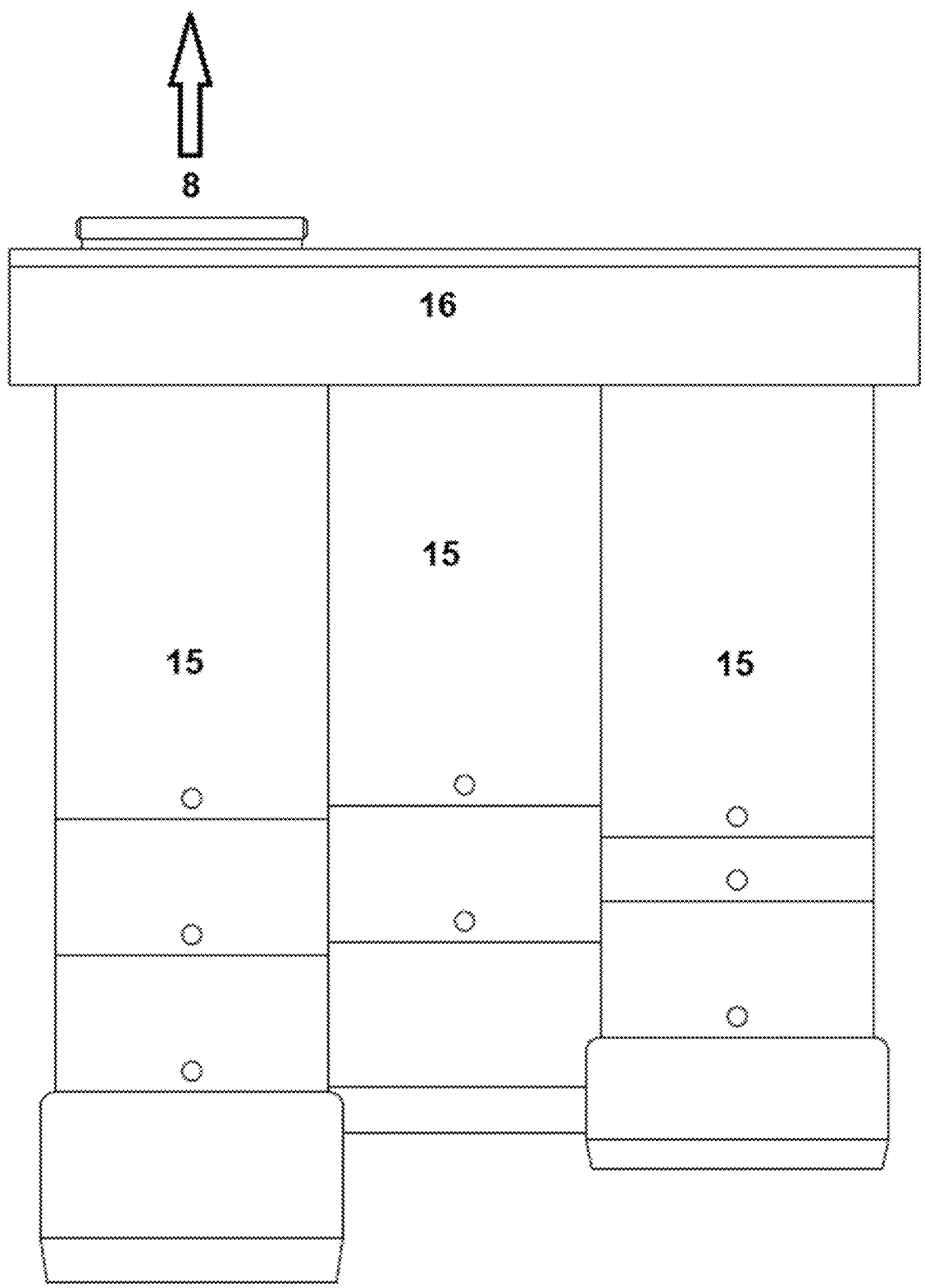
FIG. 12 shows a turret system having several objective lens system modules. The turret system allows the modules to rotate. Accordingly, each module can be rotated so as to be aligned with the rear focusing system.

FIG. 11 shows an embodiment where the rear focusing system 8 can be paired with interchangeable objective lens systems 4, which are easily attached and removed as part of modules 15. The modules 15 can be provided separately or can be part of a turret system 16 (see FIG. 12), which allows the modules 15 to be rotated into position so as to be aligned with the rear focusing system 8. The objective lens systems include objective lens systems able to provide high depth of view as described herein as well as conventional objective lens systems.

Figure 13:
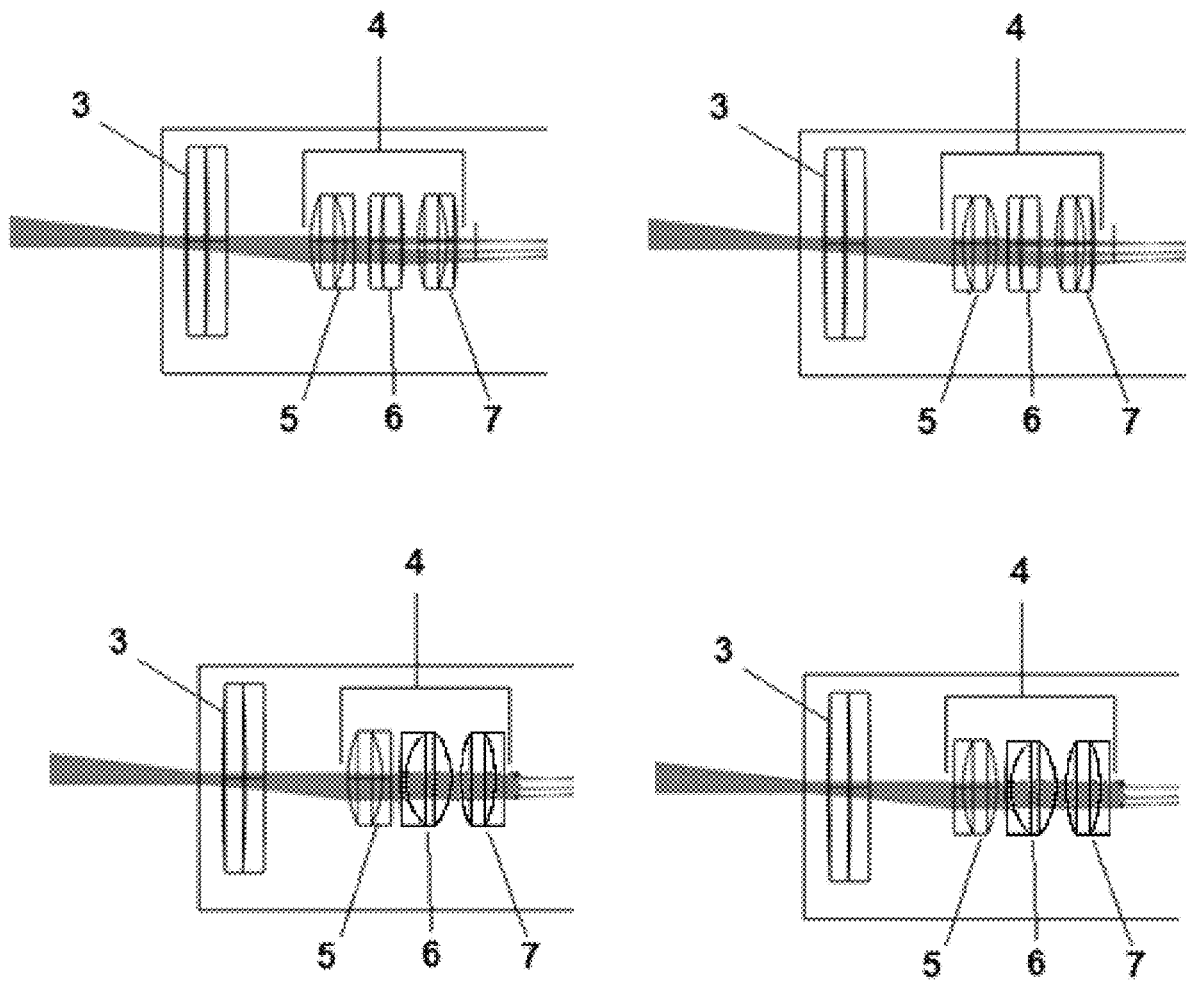
FIG. 13 shows objective lens systems, such as depicted in FIGS. 1 (top) and 6 (bottom), where the front objective lenses are oriented so that the curved surface faces toward the front of the device (figures on the left) or toward the rear of the device (figures on the right).

Adjustments for spherical correction can be made for specific operational ranges by altering the orientation of the frontal corrector lens system 3 and/or the front objective lens system 5 without regard to changing the initial construction means. For example, the frontal corrector lens system 3 and the front objective lens system 5 can be oriented so that either lens system (or both lens systems) has a front surface which is curved toward the front end of the housing. Alternatively, the front surface of either lens system can be flat or curved toward the rear end of the housing depending on the desired requirements of the device. FIG. 13 shows exemplary objective lens systems, where the front objective lenses 5 are oriented so that the curved surface faces toward the front of the device (figures on the left) or toward the rear of the device (figures on the right). Although not shown in the figure, the orientation of the frontal corrector lens 3 (i.e., the front surface being curved toward the front or being flat) can be varied with each objective lens system.

Figure 14:
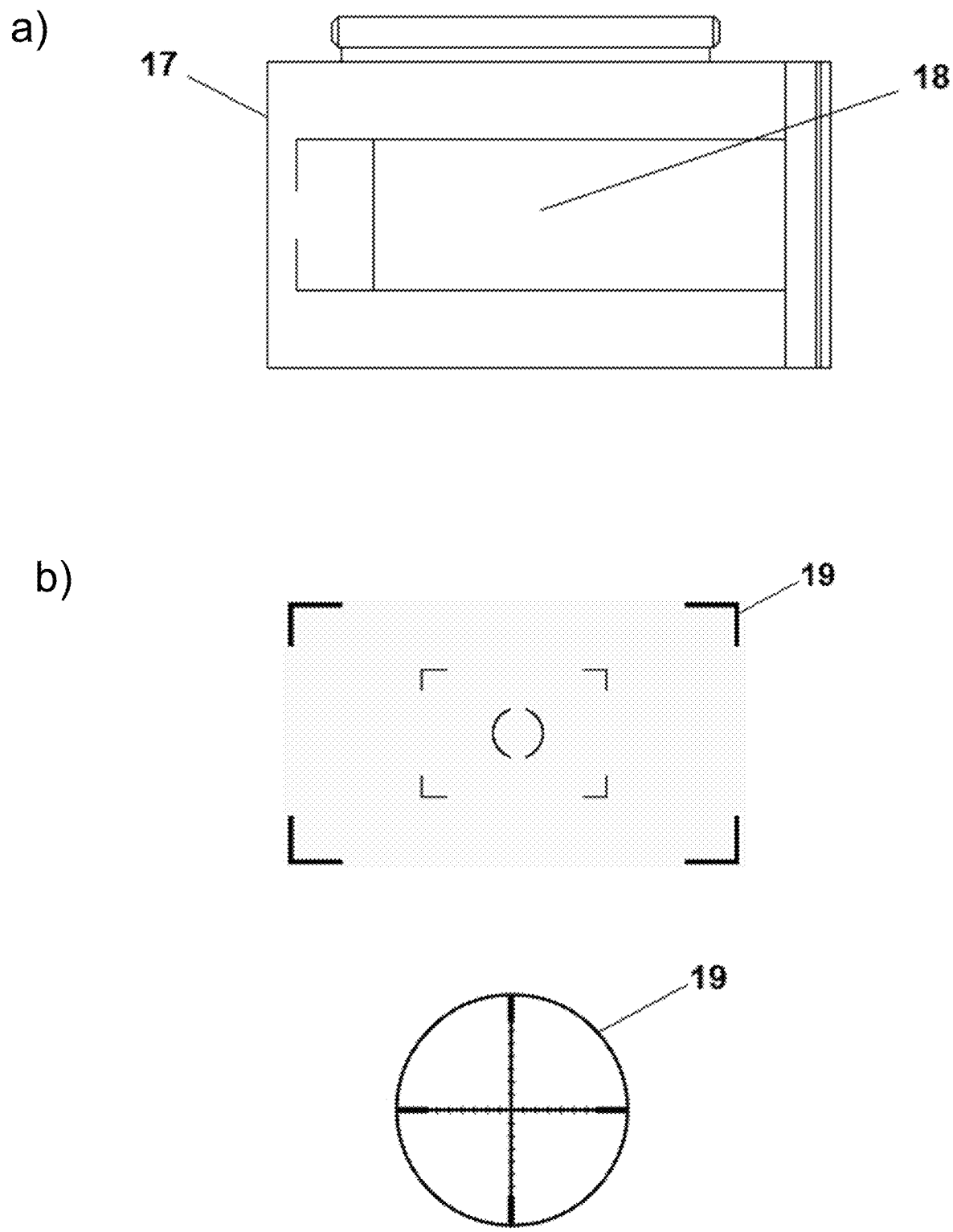
FIG. 14, panel a), shows a filter holder in an embodiment of the invention which is inserted into the optical pathway. The filer holder contains a light transmitting material having a reticle or other type of reference marking, such as seen in panel b).

FIG. 14, panel a), shows a filter holder 17 in an embodiment of the invention which is inserted into the optical pathway. The filer holder 17 contains a light transmitting material 18 having a reticle 19 or other type of reference marking, such as viewfinder markings or crosshairs as seen in panel b). The filter holder can be positioned with the optical device and so that the reticle is imaged with the object being viewed. Alternatively, the filter holder can be positioned so that when the reticle is placed into focus, the object is not imaged. Likewise, when the object is placed into focus, the reticle will not be imaged.

Figure 15:
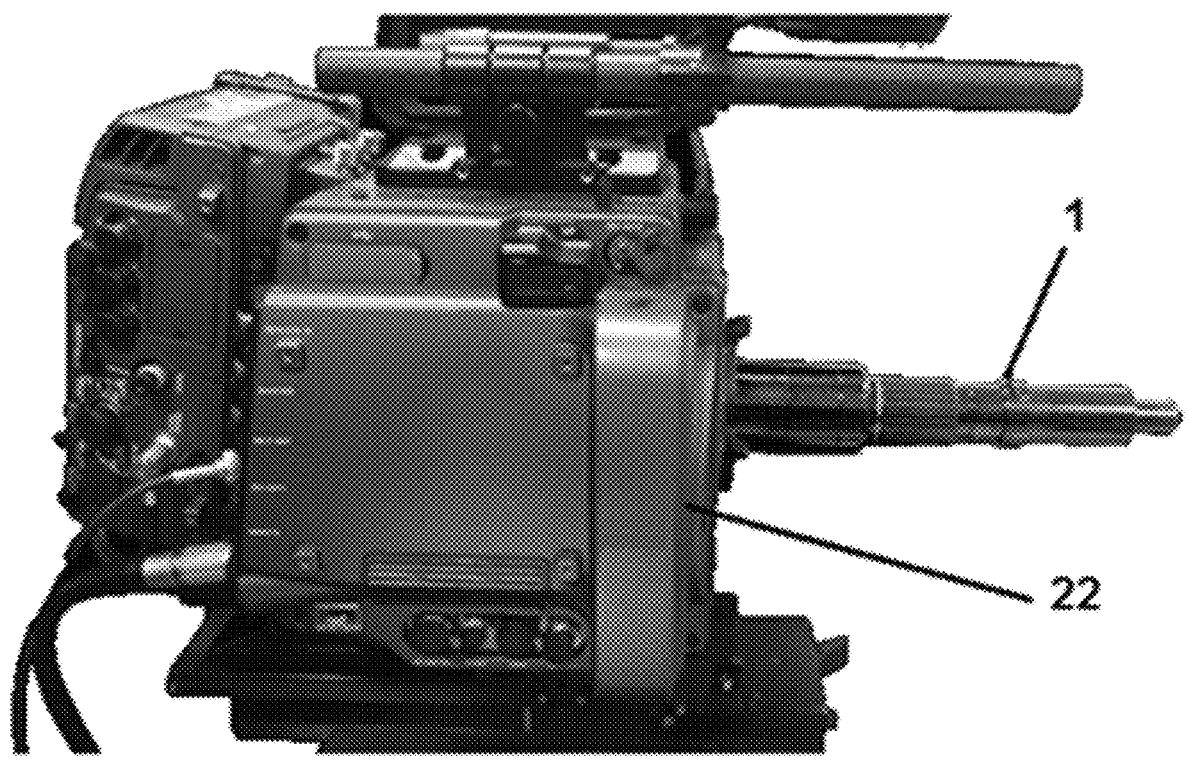
FIG. 15 shows an optical imaging system in an embodiment of the present invention attached to the front of a professional cinematography camera.

The optical imaging systems of the present inventions are also beneficial in that they are small, compact, and can be easily attached to currently existing still photography cameras, movie cameras, and video cameras. For example, FIG. 15 shows an optical imaging system 1 in an embodiment of the present invention attached to the front of a professional cinematography camera 22.

Although the embodiments exemplified herein are generally simple and economical to make, it is also understood that additional complex systems and devices can be constructed in accordance with the present invention. For example, lens systems can, in some cases, be substituted with deformable lenses, refractive and/or defractive lenses, and lenses with different gradients.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without resort to undue experimentation without affecting the scope of the invention or any specific embodiment thereof, and that such modifications or changes are intended to be encompassed within the scope of the appended claims. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

When a group of materials, compositions, components or compounds is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. In the disclosure and the claims, "and/or" means additionally or alternatively. Moreover, any use of a term in the singular also encompasses plural forms.

All references cited herein are hereby incorporated by reference in their entirety to the extent that there is no inconsistency with the disclosure of this specification. All headings used herein are for convenience only. All patents and publications mentioned in the specification are indicative of the levels of skill of those skilled in the art to which the invention pertains, and are herein incorporated by reference to the same extent as if each individual publication, patent or patent application was specifically and individually indicated to be incorporated by reference. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

The invention claimed is:

1. An optical imaging system comprising:
   a) an optical housing able to hold one or more optical lens systems, and a frontal corrector lens system positioned within the optical housing, the optical housing having a front end able to receive light from an object and a back end able to be attached to a camera, sensor, or microscope device;
   b) an objective lens system positioned behind the frontal corrector lens system within the optical housing, wherein the objective lens system comprises:
      i) a front objective lens system having a focal length of 30 mm (±10%), a middle lens system having a focal length of 100 mm (±10%), and a rear lens system having a focal length of 40 mm (±10%); or
      ii) a front objective lens system having a focal length of 30 mm (±10%), a middle lens system having a focal length of 15 mm (±10%), and a rear lens system having a focal length of 30 mm (±10%); and
   c) a rear focusing system positioned behind the objective lens system within the optical housing, wherein the rear focusing system is able to transmit light or an image from the objective lens system to a rear imaging system;
   wherein the optical imaging system provides a depth of field ranging from approximately 400 mm to infinity.

2. The optical imaging system of claim 1 wherein the objective lens system comprises a front objective lens system having a focal length of 30 mm (±5%), a middle lens system having a focal length of 100 mm (±5%), and a rear lens system having a focal length of 40 mm (±5%).

3. The optical imaging system of claim 1 wherein the objective lens system comprises a front objective lens system having a focal length of 30 mm (±5%), a middle lens system having a focal length of 15 mm (±5%), and a rear lens system having a focal length of 30 mm (±5%).

4. The optical imaging system of claim 1 wherein the optical imaging system provides a depth of field ranging from approximately 600 mm to infinity.

5. The optical imaging system of claim 1, wherein the frontal corrector lens system has a focal length of 100 mm or more and is able to decrease system distortion by c.5% or more.

6. The optical imaging system of claim 5 wherein the frontal corrector lens system has a focal length of 750 mm or more.

7. The optical imaging system of claim 6 wherein the frontal corrector lens system is able to decrease system distortion by c.10% or more.

8. The optical imaging system of claim 1 wherein the objective lens system has an angular field of view (AFOV) of 50° or more.

9. The optical imaging system of claim 1 wherein the optical housing has a length of 200 mm or less.

10. The optical imaging system of claim 1 wherein the optical imaging system is able to be integrated with 23 mm, 24 mm and 35 mm cameras.

11. The optical imaging system of claim 1 wherein the rear focusing system is able to provide adjustable focus.

12. The optical imaging system of claim 1 wherein the rear focusing system comprises a first 50 mm (±10%) lens, a second 50 mm (±10%) lens, and a −20 mm (±10%) lens.

13. An optical imaging system comprising:
   a) an optical housing able to hold one or more optical lens systems, the optical housing having a front end able to receive light from an object and a back end able to be attached to a camera, sensor, or microscope device;
   b) a frontal corrector lens system positioned within the optical housing, wherein the frontal corrector lens system has a focal length of 100 mm or more and is able to decrease system distortion by c.5% or more;
   c) an objective lens system positioned behind the frontal corrector lens system within the optical housing, wherein the objective lens system is a modified eyepiece lens system or microscope objective;
   d) a rear focusing system positioned behind the objective lens system within the optical housing, wherein the rear focusing system is able to transmit light or an image from the objective lens system to a rear imaging system;
   wherein, the optical imaging system is able provide a depth of field ranging from approximately 400 mm to infinity.

14. The optical imaging system of claim 13 wherein the objective lens system comprises a front objective lens system having a focal length of 30 mm (±5%), a middle lens system having a focal length of 15 mm (±5%), and a rear lens system having a focal length of 30 mm (±5%).

15. The optical imaging system of claim 13 wherein the objective lens system comprises a front objective lens system having a focal length of 30 mm (±5%), a middle lens system having a focal length of 100 mm (±5%), and a rear lens system having a focal length of 40 mm (±5%).

16. The optical imaging system of claim 13 wherein the optical imaging system is able to provide a depth of field ranging from approximately 800 mm to infinity.

17. The optical imaging system of claim 13 wherein the objective lens system has an angular field of view (AFOV) of 60° or more.

18. The optical imaging system of claim 13 wherein the optical imaging system is able to be integrated with 23 mm, 24 mm and 35 mm cameras.

19. An optical kit comprising two or more interchangeable objective lens systems on a turret system, wherein each of the interchangeable objective lens systems is able to be positioned into optical communication to a rear focusing system, said rear focusing system able to transmit light or an image from the objective lens system to a rear imaging system so as to form an optical imaging system, wherein at least one of the two or more interchangeable objective lens systems comprises:
   i) a front objective lens system having a focal length of 30 mm (±5%), a middle lens system having a focal length of 100 mm (±5%), and a rear lens system having a focal length of 40 mm (±5%); or
   ii) a front objective lens system having a focal length of 30 mm (±5%), a middle lens system having a focal length of 15 mm (±5%), and a rear lens system having a focal length of 30 mm (±5%);
   wherein the optical imaging system further comprises a frontal corrector lens system attached in optical communication to the two or more interchangeable objective lens systems, wherein the frontal corrector lens system has a focal length of 100 mm or more and is able to decrease system distortion by c.10% or more, and
   wherein the optical imaging system provides a depth of field ranging from approximately 400 mm to infinity.

20. The optical kit of claim 19 wherein the optical imaging system is able to be integrated with 23 mm, 24 mm and 35 mm cameras.

* * * * *